United States Patent [19]

Head et al.

[11] 4,087,306
[45] May 2, 1978

[54] TURN-UP OR TURN-OVER BLADDER FOR TIRE BUILDING MACHINES

[75] Inventors: William J. Head, Rollingen; Erik R. Kampinga, Ettelbruck; John Kolbjorn Rodseth, Bonnevoie, all of Luxembourg

[73] Assignee: The Goodyear Tire & Rubber Company, Akron, Ohio

[21] Appl. No.: 719,050

[22] Filed: Aug. 30, 1976

[51] Int. Cl.² .......................................... B29H 17/22
[52] U.S. Cl. ...................................... 156/401; 92/92; 156/132
[58] Field of Search ............... 156/110 R, 123 R, 126, 156/128 R, 128 I, 131, 132, 133, 394 R, 400, 401, 414–420; 92/92, 98 D, 103 F

[56] References Cited

U.S. PATENT DOCUMENTS

| 3,044,533 | 7/1962 | Lowe | 156/401 |
| 3,078,204 | 2/1963 | Appleby | 156/132 |
| 3,265,549 | 8/1966 | Woodhall et al. | 156/132 |
| 3,418,192 | 12/1968 | Nadler | 156/401 |
| 3,525,655 | 8/1970 | Wood et al. | 156/123 |
| 3,692,605 | 9/1972 | Cantarutti | 156/132 |
| 3,694,290 | 9/1972 | Pacciarini et al. | 156/132 |
| 3,698,987 | 10/1972 | Woodhall et al. | 156/132 |
| 3,853,653 | 12/1974 | Olbert et al. | 156/133 |
| 3,966,536 | 6/1976 | Schmitt | 156/132 |

FOREIGN PATENT DOCUMENTS 746,868  11/1966  Canada ................. 156/416

Primary Examiner—William A. Powell
Assistant Examiner—John E. Kittle
Attorney, Agent, or Firm—R. S. Washburn

[57] ABSTRACT

An annular bladder providing both circumferential expansion and rolling movement normal to its circumference in response to inflation thereof, said bladder having a cylindrical outer wall extending between a forward edge and a rearward edge and being turned radially and axially inward at the respective edges, the bladder comprising a first and a second circumferential zone and in said outer wall a transition zone, said first zone extending in a forward direction from said transition zone, said second zone extending in a rearward direction from said transition zone, said first zone having greater resistance to circumferential elongation relative to the second zone and said second zone having lesser resistance to circumferential elongation relative to the first zone, said transition zone being located a predetermined distance forward of the rearward edge of said bladder when the same is uninflated.

38 Claims, 28 Drawing Figures

TURN-UP OR TURN-OVER BLADDER FOR TIRE BUILDING MACHINES

The foregoing abstract is not to be taken as limiting the invention of this application, and in order to understand the full nature and extent of the technical disclosure of this application, reference must be made to the accompanying drawing and the following detailed description.

The present invention relates to an annular bladder having the novel and unique property of rolling movement in a direction normal to its circumference while being expanded circumferentially in response to inflation. Further, the invention relates to an annular bladder in combination with apparatus for turning one circumferential portion of an endless band around a fold line or about a bead or grommet so that the so turned portion overlies an adjacent circumferential portion of the band.

The invention is particularly useful in building tires for turning a ply ending about a bead core to form a tire carcass and for turning edge portions of an endless ply band about another portion thereof to form folded edges desired for tire breaker belts. From what follows herein other advantageous uses for a bladder in accordance with the invention will be apparent to persons skilled in related arts.

In the related arts heretofore, numerous arrangements and constructions of inflatable turnup bladders have been proposed and employed. Many such inflatable bladders have been found to possess advantages over other devices for turning plies about inextensible bead cores; however, such inflatable turnup bladders have heretofore had the disadvantage of requiring auxiliary means, additional to the bladder itself, to cause the turnup bladders to roll axially, after being inflated, to roll the bladders axially and the ply endings into secure wrapping engagement with a bead core. Such auxiliary means have been universally expensive to provide, occupy useful and valuable space, interfere to some extent with the convenient operation of the apparatus and particularly with the placement of bead cores, and add to the expense of maintenance of the apparatus.

Briefly and broadly, the invention comprises an annular bladder providing both circumferential expansion and rolling movement normal to its circumference in response to inflation thereof, the bladder having a cylindrical outer wall extending between a forward edge and a rearward edge and being turned radially and axially inward at the respective edges, the bladder comprising a first and a second circumferential zone and in said outer wall a transition zone, the first zone extending in a forward direction from said transition zone, the second zone extending in a rearward direction from said transition zone, the first zone having greater resistance to circumferential elongation relative to the second zone and the second zone having lesser resistance to circumferential elongation relative to the first zone, the transition zone being located a predetermined distance forward of the rearward edge of said bladder when the same is uninflated.

The rolling movement of a bladder in accordance with the invention is surprising to persons skilled in the most closely related arts. It has heretofore been a commonly held belief that it would be impossible for a bladder to move itself axially or normal to its own circumference in response only to inflation since it was obvious that the forces acting on the bladder parallel to its axis; that is, perpendicular to the plane of its circumference, are necessarily equal and opposite. The inflation pressure within the bladder acts on the same projected area in both axial directions. Nevertheless, we have discovered that a bladder can be made to move, to roll axially of itself and to do useful work simply by inflating the bladder without requiring application of any force external to the bladder to cause the rolling movement. Moreover, the bladder in accordance with the invention not only is caused to roll perpendicular to its own circumference during and in response only to the inflation of the bladder but also, when deflated, to return promptly to its original uninflated position, also without external assistance and the action is repeatable simply by inflating and deflating the bladder.

We have found that an essential characteristic of a bladder in accordance with the invention is the provision of two circumferential zones. The term zone herein is used to describe that portion of a surface or body of revolution between two parallel planes which are perpendicular to the axis of revolution of the surface or body. The first circumferential zone differs from the second circumferential zone in that the first zone possesses a greater resistance to elongation in a circumferential direction while the second circumferential zone has a relatively lesser resistance to circumferential elongation, each with respect to the other zone. The first and second zones extend oppositely away from the transition zone respectively toward the forward edge and the rearward edge of the outer circumferential wall of the bladder. Forward, as used herein, will be understood to mean the direction of movement of the bladder in response to its inflation; rearward, refers to the opposite direction.

It should be noted that as a consequence of providing greater resistance to circumferential elongation, the first zone will have less resistance to axial elongation than the second zone and that similarly in the consequence of providing lesser resistance to circumferential elongation in the second zone the second zone will have a greater resistance to axial elongation than the first zone.

The bladder in accordance with the invention, while being inflated, rolls forward over its own forward edge in a direction from the second zone toward the first zone; when deflated, it returns to its original location as well as its uninflated state without outside assistance solely as a result of its deflation. The relative axial length of the respective zones, as well as the location of the transition zone have been found to be important variables. The degree of relative resistance to circumferential elongation in the respective zones as well as the concomitant relation in resistance to axial elongation in the respective zones is also important. We have further found that additional control of the axial movement in both directions is obtained by suitable location of the transition zone with respect to the rearward edge of the uninflated bladder and also by providing a second transition zone in the bladder.

To illustrate more fully the principles and practice of the invention, we present below examples of presently preferred embodiments of the invention illustrative of the best modes of operation thereof, described with reference to, as well as by the attached drawings, in which.

Figure 1:
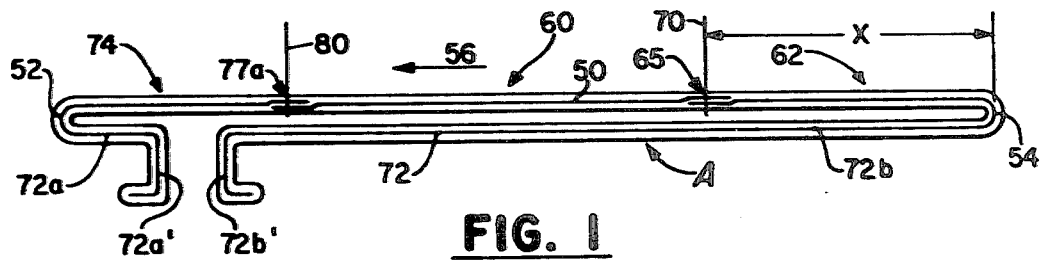
FIGS. 1-6 illustrate schematically representative cross-sections of bladders embodying the invention.

Several bladders A–F in accordance with the invention are illustrated in FIGS. 1–6. Each is particularly adapted to exploit the principles of the invention, while being particularly adapted as well to specific uses as will presently appear. Each is an annular bladder capable of providing both circumferential expansion and rolling movement normal to its circumference solely in response to inflation thereof; each of the bladders is shown in its uninflated state to which it returns solely in response to deflation of the bladder. Each has a cylindrical outer wall 50 extending between a forward edge 52 and a rearward edge 54. The terms forward and rearward have reference to the direction 56 of the rolling movement in response to inflation in which the outer wall moves forward toward and over the forward edge 52 and away from the uninflated position of the rearward edge. The outer wall 50 is turned radially and axially inward at each of the respective edges.

In accordance with the invention, each bladder comprises a first circumferential zone 60 and a second circumferential zone 62. A transition zone 65 located in the outer wall 50 of each bladder designates that zone from which the first zone 60 extends in a forward direction and the second zone 62 extends in a rearward direction each toward the respectively associated edge. In particular, the first zone 60 is provided with greater resistance to circumferential elongation relative to the zone 62 and correspondingly the zone 62 is provided with a lesser resistance to circumferential elongation relative to zone 60. The transition zone 65 is located a predetermined distance x forward of the edge 54 of the bladder when the latter is uninflated. As will presently be made more clear, the predetermined distance x is established empirically in accordance with the particular use in which the bladder is employed.

In order to effect conveniently the difference in resistance to circumferential elongation in one zone with respect to the other zone, each zone comprises a pair of cord plies the cords of which are oriented at equal and opposite angles with respect to a plane 70 containing a circumference of the bladder which plane is, of course, perpendicular to the axis of the bladder. The cords in the zone 60 are disposed at lesser angles with respect to the plane 70 and the cords of the zone 62 are disposed at greater angles with respect to the plane. As pointed out hereinabove, as a consequence of providing greater resistance to circumferential elongation, the first zone 60 will have less resistance to axial elongation than does the second zone 62 and similarly in consequence of providing lesser resistance to circumferential elongation in the second zone 62 that zone will have a correspondingly greater resistance to axial elongation than does the zone 60.

Generally, the respective cord angles in the zone 60 will be selected in the range of from 35° to 65°, while the cord angles of the plies in the zone 62 will be selected in the range of from 45° to 90°. The difference between the selected lesser and greater angles will be from 10° to 30°. The selection of cord angles is made empirically in accordance with the particular use to which the bladder is to be applied. Presently, we shall describe in specific examples selected cord angles for the respective zones which have been found useful in particular applications. Normally, the predetermined distance X referred to above will be at least 10 percent of the distance between the forward and rearward edge while the bladder is uninflated. Here, the transition zone 65 is formed by a circumferential splice joining the pair of cord plies of the zone 60 to the cord plies of the zone 62. The splice can be made in any known manner, in accordance with the prior art.

In general, bladders according to the invention comprise elastomeric membranes of uniform thickness which encase the previously described cord plies. In any case, the rolling movement in response to inflation as well as to deflation is wholly independent of differences in thickness of the membranes.

Referring more specifically now to FIG. 1, the bladder A comprises an inner wall 72 having a first portion 72a extending from the forward edge 52 and a second portion 72b extending from the rearward edge 54. Each of the two portions terminate in annular flanges 72a', 72b', respectively, by which the bladder A can be secured coaxially to a forming drum for building tires or tire components.

In addition to the first zone 60 and the second zone 62, the bladder A of FIG. 1 further includes a third zone 74 provided with lesser resistance to circumferential elongation than the first zone 60 and has as well a second transition zone 77a between the first zone 60 and the third zone 74. This second transition zone 77a is in the outer wall 50 spaced from the forward edge 52 sufficiently to allow the outer wall in the third zone 74 to conform to a tire bead disposed therearound as will presently appear. In the third zone 74 are a pair of cord plies of cords oriented at equal and opposite angles with respect to a plane 80 of the circumference of the bladder. These third zone angles are greater than the angles in the first zone 60 and the pair of plies of the third zone 74 are spliced to the pair of plies of the zone 60 in the second circumferential transition zone 77a. In the particular embodiment being described, the second transition zone 77a is located at about 30 millimeters from the forward edge 52 and about 300 millimeters from the rearward edge 54.

In the bladder A, the cord angles in the first zone 60 may range from 55° to 65° and in particular are at 60°. In the second zone 62, the cord angles can range from 75° to 85°, and are specifically 80°. In the third zone 74, the cord angles are like the angles in the second zone, namely, 75° to 85°, and in particular, 80°.

Figure 2:
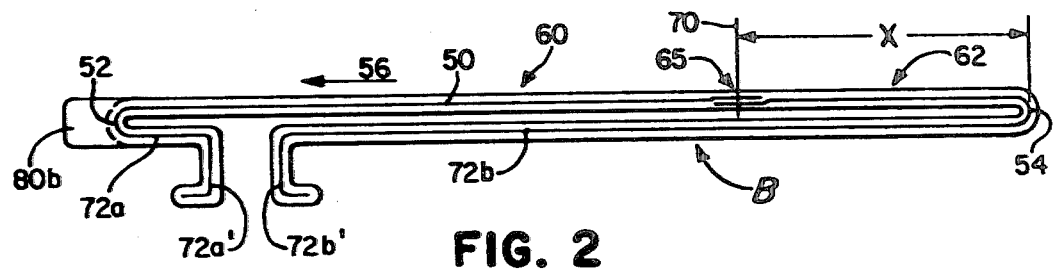

In FIG. 2, the annular bladder B according to the invention has the zone 60 of less circumferential expansion provided by a pair of cord plies, the cords of which are oriented at from 55° to 65°, in particular 60°, with respect to a plane 70 and extend from the transition zone 65 to and around the forward edge 52 from which the pair of plies extend axially inwardly, in the inner wall portion 72a, and terminate in the associated annular flange 72a'. The zone 62 havng the pair of cord plies with cords disposed at greater angles, namely, 80°, and generally from 75° to 85°, with respect to the plane 70, extends from the transition zone 65 to and around the rearward edge 54 and thence in the second portion 72b of the inner wall to terminate in the associated annular flange 72b'.

Attached integrally to the forward edge 52 is an uninflatable elastomeric ring 80b which is secured or joined integrally to the forward edge. The ring 80b extends axially outward from the effective position of the forward edge so as to provide particular cooperation with an inextensible bead ring when enfolding such bead in the ply endings of a tire carcass. In the transition zone 65, the respective circumferential edges of the greater and lesser angled cord plies are spliced to one another in a conventional manner. The distance X can range from 50 millimeters to 150 millimeters, being in the bladder B 50 millimeters.

Figure 3:
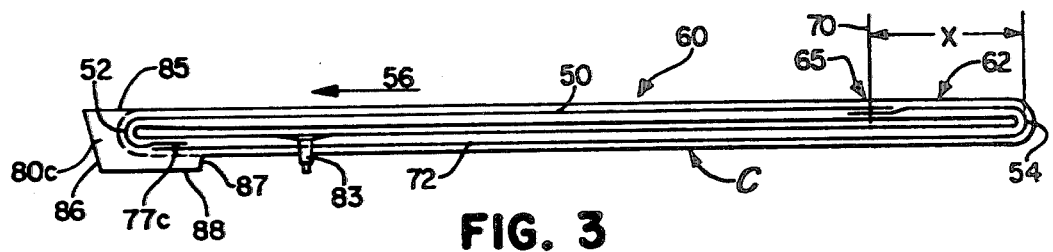

In FIG. 3 there is illustrated a further embodiment of the annular bladder according to the invention. In this bladder C the cord plies of the zone 60 extend from the transition zone 65 forward to the forward edge 52, there being turned radially and axially inwardly. The cord plies of the zone 62 extend rearwardly to and about the rearward edge 54 and thence forward in the inner wall 72 to a second splice between the circumferential edges of the respective plies of the zones 60 and 62. This second splice can be considered to define the second transition zone 77c. The inner wall 72 in the bladder C is continuous between the forward and the rearward edges thus forming a tubular annular bladder. Means for providing air flow into and out of the bladder is provided as a conventional air connection nipple 83 disposed conventionally in the inner wall. The nipple is located closer to the forward edge 52 than to the edge 54, being disposed in a portion of the bladder which is relatively free from movement in service so that the nipple is not subjected to undue stress at any time during the bladder action. A particular feature in this embodiment is the elastomeric ring 80c which is attached and made integral with the forward edge of the bladder. This elastomeric ring 80c has, in section, a partial trapezoidal profile having the outer and longer base 85 of the trapezoid at the same radial level as the remainder of the bladder outer wall 50. The slant sides 86, 87 of the trapezoid slope convergingly toward the axis of the annular bladder. For purposes which will presently be made more clear, the shorter base 88 of the trapezoidal outline is spaced radially inwardly with respect to the inner wall 72 of the bladder. The slant sides of the trapezoidal form make angles of about 15° with the plane parallel to the circumference of the bladder.

Figure 4:
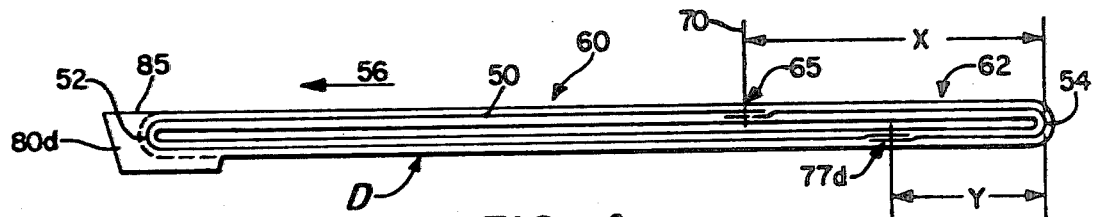

The cord angles of the zone 60 are 60°, selected from a range of from 55° to 65°. The angles in the zone 62 are 80° selected in the range of 75° to 85°. The dimension X is 50 millimeters. A bladder D embodying the principles of the invention is illustrated in FIG. 4. In this bladder D the zone 60 extends forwardly from the transition zone 65 to and about the forward edge 52 and thence rearwardly to a second transition zone 77d disposed in the inner wall 72. The zone 62 extends from the transition zone 65d rearwardly to and about the rearward edge 54 and thence forward in the inner wall 72 to the transition zone 77d where the respective circumferential edges of the cord plies of the two zones 60, 62 are spliced circumferentially in a conventional manner. As in the bladder C the inner wall 72 is continuous from the forward 52 to the rearward edge 54 thus forming an enclosed tubular annular bladder. Suitable means providing for the flow of air to and from the bladder are provided in the inner wall as, for example, a conventional nipple 83. Also, like the embodiment of FIG. 3, the elastomeric ring 80d having a trapezoidal outline form is secured integrally to the forward edge in the manner described in connection with the bladder C. The bladder D of FIG. 4 differs from the bladder C, FIG. 3, particularly in the location of the respective transition zones 77c and 77d. The zone 77c is located within the axial width of the ring 80c. The zone 77d is in the inner wall 72 inward a distance Y from the edge 54. The distance Y can range from 100 to 160 millimeters and is, in the bladder D, 130 millimeters.

Figure 5:
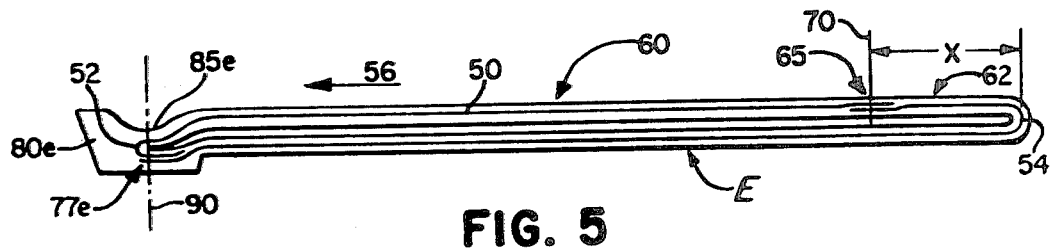

In FIG. 5, a bladder E according to the invention has a first zone 60 and a second zone 62 as have been described. The cord plies of the first zone 60 extend from the transition zone 65 toward the forward edge 52. This bladder E is provided also with an elastomeric ring 80e secured integrally to and about the forward edge 52 in a manner like that described in reference to FIGS. 3 and 4. The outer circumferential surface 85e of the elastomer ring, however, is formed as a molded groove to accommodate a bead portion of a tire carcass and particularly to locate or assist in locating an inextensible bead ring disposed therearound. To accommodate this groove and maintain a generally uniform thickness of overlying elastomer, the pair of cord plies near the edge 52 is turned inwardly in a contour paralleling the contour of the groove to the forward edge 52 which is located in a common plane with the central plane 90 of the groove. The plies of the zone 60 are then turned radially and axially inwardly a distance sufficient to provide for a splice between the cord plies of the zone 60 and the cord plies of the zone 62 which extend from the transition zone 65 rearwardly to and about the rearward edge 54 and thence forward in the inner wall 72 to the transition zone 77e. The plies of the zone 62 are similarly turned inwardly to follow the contour of the plies of the zone 60 and the groove. It is to be noted that the zone 62 and the plies of greater cord angle therein extend throughout the inner wall 72.

The lesser angles of the cord plies of zone 60 may be from 55° to 65° with respect to a circumferential plane 70. The greater angles of cord plies in zone 62 may be from 60° to 80° with respect to such plane. The midplane 70 of the transition zone 65 can be located from 50 to 100 millimeters forward from the rearward edge 54. The particular embodiment E, the angles of zone 60 and 62, are, respectively, 60° and 80°, and the predetermined distance X is 50 millimeters.

Figure 6:
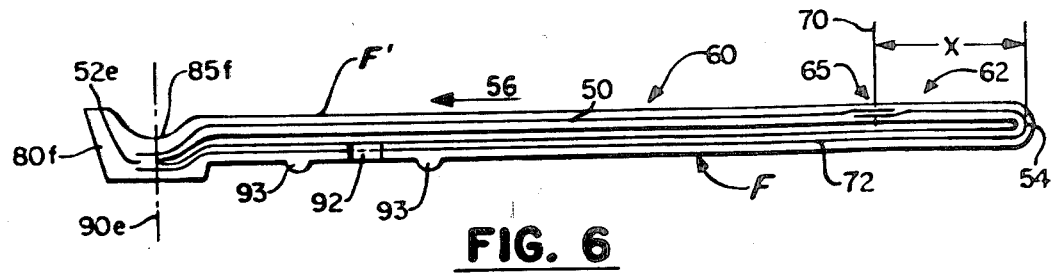

The bladder F, FIG. 6, is a further embodiment in accordance with the invention. An elastomeric ring 80f having generally a trapezoidal outline is provided with a bead accommodating groove 85f coaxially therearound at the forward edge 52. The cord plies of the zone 60 again extend forward from the transition zone 65 to the forward edge 52e. For fabricating convenience, the cord plies of zone 60 and the cord plies of zone 62 extend parallel one another beyond the forward edge 52e into the elastomeric ring 80f and are there spliced one to the other by an adhesive precure cement. The structure is thus made an equivalent to the formation of the forward edge 52 in each of the previously described bladders. Further, the forward edge so formed disposes the associated edge of the inflatable chamber of the bladder in a common plane 90e with the center of the bead groove.

A further and particularly noteworthy feature of the bladder F is the provision of an inflation inlet means in the form of a simple hole 92 formed in the inner wall of the bladder. The hole is flangeless and free of any nipple or other fitting added thereto. A pair of sealing ridges 93 disposed circumferentially on the inner wall 72 respectively forward and rearward from the hole 92 cooperate with cylindrical support surfaces of a tire drum to be described presently. The cords of the pair of plies in the zone 60 are oriented at 60° and the cords of zone 62 oriented at 80° with respect to a plane of the circumference and the transition zone mid-plane 70 is disposed about 100 millimeters forward of the rearward edge 54.

Increasing the length of the bladder does not seem significantly to affect the rolling movement desired in accordance with the invention. The bladder can be longer than necessary, but cannot be too short, or no rolling will occur. In any case the length of the bladder, defined as the distance while not inflated between the forward 52 and rearward 54 edges must be sufficient to turn the length of ply portions overlying the bladder around a bead or around a fold line into overlying relation with respect to a ply portion disposed beyond the bead or fold line. It is also desirable that the length of the bladder be not much greater than is required for turning such ply endings in order that space required not become excessive in a tire or belt building machine. The bladders described in the present disclosure are each approximately 13 inches (about 335 millimeters) in length between the respective edges.

A number of bladders were molded to a diameter of 556 mm having the form of the bladder of FIG. 4 and differing in the following particulars.

| Bladder No. | Belt Building Diameter | Cord Angle Zone 60 | Cord Angle Zone 62 | Dimension X | Dimension Y |
|---|---|---|---|---|---|
| 1 | 24"(610 mm) | 40° | 50° | 165 mm | 105 mm |
| 2 | 24"(610 mm) | 40° | 57° | 165 mm | 105 mm |
| 3 | 24.15"(613.6 mm) | 50° | 80° | 115 mm | 145 mm |
| 4 | 22.9"(581 mm) | 45° | 72° | 100 mm | 130 mm |
| 5 | 22.9"(581 mm) | 45° | 80° | 100 mm | 130 mm |

Of the foregoing bladders built and tested, Nos. 3 and 4 were demonstrated to be satisfactory with No. 4 preferred, having the additional advantage of providing better stitching of the ply endings than No. 3 The remaining bladders in this series either failed to roll over as desired or rolled over and failed to return. The overall length of the bladders in this series was 320 millimeters.

In another test the bladder formed as illustrated in FIG. 4 had the following dimensions.

| Diameter | Cord Angle Zone A | Cord Angle Zone D | Dimension X | Dimension Y |
|---|---|---|---|---|
| 1 meter | 40° | 50° | 195 mm. | 130 mm. |

This bladder performed very satisfactorily both as to rolling movement forward in response to inflation and return movement in response to deflation. The overall length of the bladder was about 355 mm.

The forward edge and rearward edge as used herein refer to the respective axially outward surfaces of the outer cord ply of the pair of cord plies, the bladder being uninflated. The elastomer in which the cord plies are encased is somewhat exaggerated in thickness in the figures and in any case has no significant part in the desired action of the bladder. The elastomer employed is conventional, requiring no description to persons skilled in the related arts.

While no quantitative relation between the diameter of the bladder and the cord angles of the first and second zones has been established, it appears that as the diameter is increased, the cord angles for best performance will be reduced relative to the angles of, e.g. 60° and 80°, employed in the bladders of 12 to 15-inch diameters.

It will be apparent to persons skilled in the related arts that the essential feature of the bladders according to the invention is the construction and arrangement of the two zones of differing circumferential elongation, and that the particular additional features of the bladders described can be interchanged or differently combined to suit a particular use of the unique property of self-induced axial movement.

Figure 7:
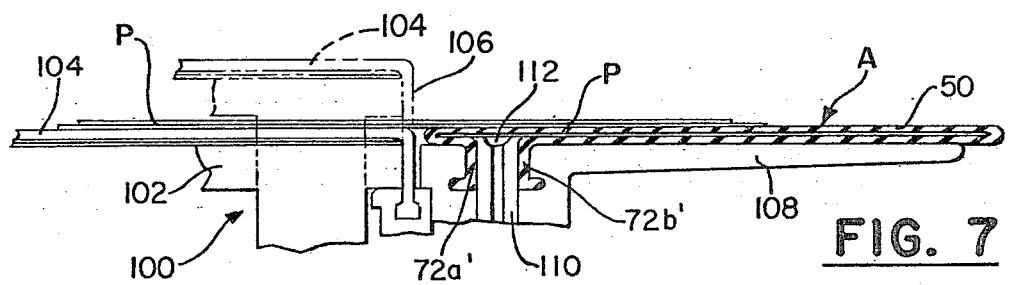
FIGS. 7-9 illustrate a combination embodying the invention and operation thereof.
Figure 8:
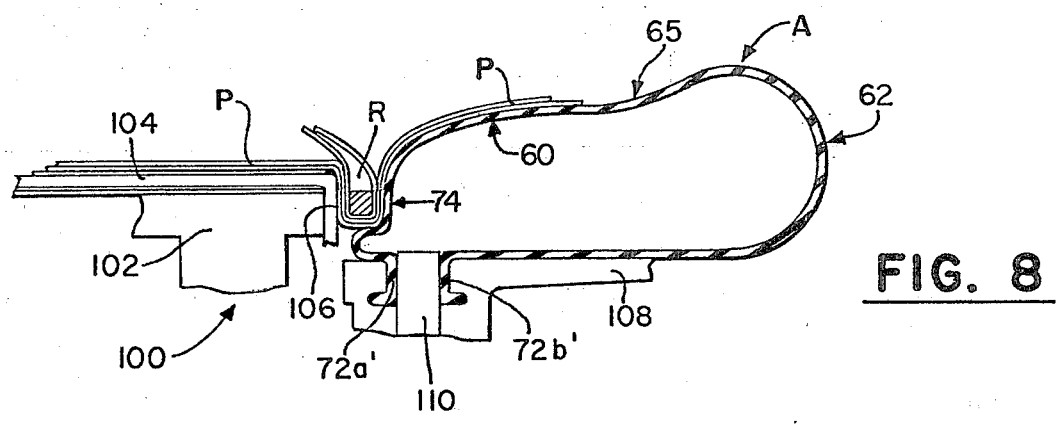
Figure 9:
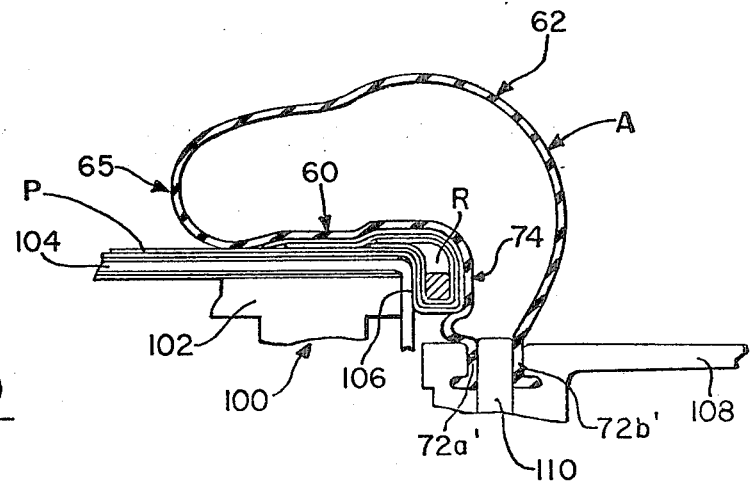

Particular advantages of the invention are achieved by a combination of a bladder as hereinbefore described with a tire forming drum wherein such bladder is operated to fold ply endings about a bead to form a tire carcass. One such combination is illustrated in FIGS. 7, 8, and 9, wherein an annular bladder A, described with reference to FIG. 1, forms a part of a tire building drum 100. In FIG. 7 only a representative partial axial section of the drum is shown. Except for the bladder itself, such building drums are known to persons skilled in the art. For complete details as to the construction of such drums reference may be had for example to U.S. Pat. No. 3,078,204 to Appleby or to U.S. Pat. No. 3,265,549 to Woodhall et al.

The drum 100 includes a plurality of segments 102 disposed about the rotation axis of the drum and movable radially between a collapsed position and an expanded position, shown in FIG. 7 in broken line. The expansion of the segments also expands a cylindrical elastomeric membrane, the sleeve 104, so that a radial shoulder 106 is formed in the drum and in the tire carcass ply P or plies disposed thereon. The building drum includes a coaxial side or auxiliary drum 108 of fixed diameter. The bladder A is secured coaxially about the drum 108. The cylindrical surface of the auxiliary drum 108 circumferentially engages the inner wall 72 of the bladder which is secured to the auxiliary drum by means of the annular flanges 72a', 72b' of the bladder. A spacer 110 between the flanges is provided with a passage 112 which communicates with air piping to provide inflation inlet means for the bladder. With the drum 100 in its collapsed position, the surface of the outer wall 50 of the bladder is disposed at the same radial level as the surface of the sleeve 104 so as to form a cylindrical building surface. One or more plies are disposed circumferentially about the building surface after which the segments 102 and sleeve 104 are expanded to form the shoulder, as illustrated in FIGS. 7, 8, and 9. A bead core assembly R is then moved over the uninflated bladder A and adhered coaxially to the shoulder formed in the plies by expansion of the drum.

In FIG. 8, an intermediate stage in the inflation of the bladder A shows the region of the zone 74 of the bladder A adjacent the forward edge expanded radially such that the bladder and the ply endings thereon conform to the bead core assembly R. As the bladder is inflated, the zone 60, because of its greater resistance to circumferential elongation expands to a lesser diameter than does the zone 62. This difference in the radial expansion of the two zones provides a built-in force differential which by itself serves to urge the bladder axially, to the left as seen in FIGS. 8 and 9, causing the bladder to roll over the bead assembly R and the shoulder drum. This movement is accomplished entirely without any externally applied force or external means for driving the bladder. It will be apparent that this advantage leads to simplified construction of a tire building machine as well as to reduced maintenance expense and to a valuable saving of space.

The position of the bladder A near the end of its axial movement toward the left is seen in FIG. 9. It will be appreciated that the rolling movement as illustrated in the successive figures occurs very rapidly and that the actual shapes are transient and not static as necessarily shown in the figures.

Upon release of its inflating air pressures, the bladder returns promptly to its uninflated state as seen in FIG. 7, again without means for assisting its axial movement.

In the bladder, FIG. 7, the cords in the zone 60 are arranged at 60°, in the zone 62 at 80°, and in the zone 74 at 80°. The transition zone 65a is located at $x = 50$ mm. from the rearward edge 54. The transition zone 77a is located at 30 mm. from the forward edge 52 and the overall length of the bladder is 300 mm.

The range of angles of the cord arrangements of zone 60 believed to be useful in the arrangement of FIG. 7 are from 55° to 65° while the angles of zone 62 may range from about 75° to about 85°. Of equal importance is the location of the transition zones. The dimension X, FIG. 1, may range from 50 to 100 mm.

Figure 10:
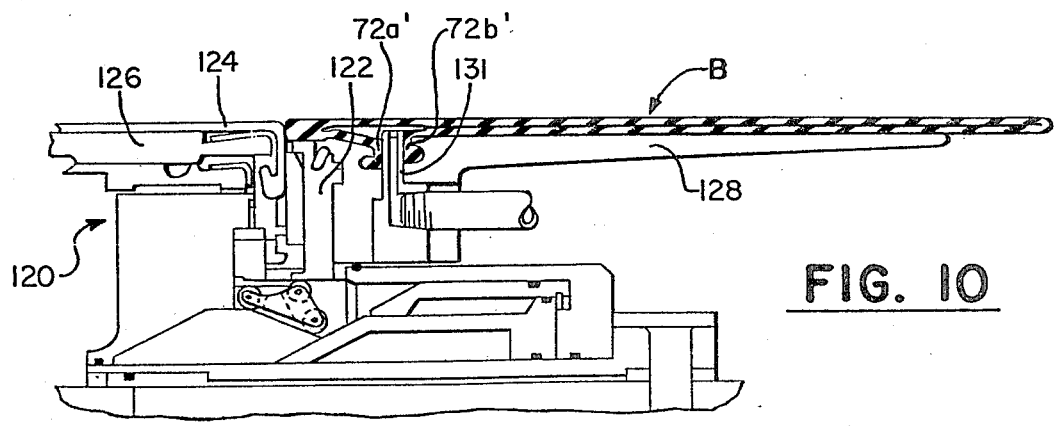
FIGS. 10–13 illustrate a further combination in accordance with the invention and operation thereof.

A combination incorporating the bladder B in a tire building drum 120 is illustrated in FIG. 10. This building drum 120 is distinguished by the provision of a plurality of radially movable fingers 122 disposed immediately adjacent the center sleeve 124 overlying the shoulder forming segments 126 which can be moved radially of the drum to provide a radial shoulder, FIG. 12. The drum includes a cylindrical support of fixed diameter provided by an auxiliary drum 128 in which the fingers 122 are adapted to slide radially. The bladder B is secured near its forward edge 52 by the annular flanges 72a', 72b' which are received in recesses formed in the auxiliary drum. The elastomeric ring 80b secured integrally to the forward edge 52 of the bladder is disposed circumferentially about the fingers 122 and, when the fingers are expanded radially outwardly, expands into contact with the ply P urging it radially outwardly into firm and concentric engagement with the radially inner surface of the bead assembly R prior to the turnup of the plies. The forward edge 52 of the bladder is thus securely located relative to the bead and, on being inflated, the bladder then rolls forward to wrap the ply endings about the bead to overlie the ply portions axially inward of the bead.

In the bladder B the cords are arranged at angles of from 55° to 65°, preferably 60° in the zone 60 and in zone 62 are arranged at angles of from 75° to 85° and preferably 80°. The transition zone 65b is located inwardly from the rearward edge 54 at 50 millimeters. This dimension X may range from 35 to 65 millimeters. As previously pointed out, the zone 62 extends from the transition zone 65 to and about the rearward edge and thence to the annular flange 72b'. The zone 60 extends to and about the forward edge 52 and terminates in the associated annular flange 72c. The length of the bladder between the edges is 330 millimeters and the diameter of the bead accommodated is 13 inches. By adjusting only the diameters, the bladder can be made to accommodate beads of from 12 to 15 inches. On being inflated, the bladder rolls forward to wrap the ply endings about the bead without requiring any instrumentality other than or external to itself. The fingers are provided with outward surfaces conforming to a cylinder conjugate with the cylindrical inner surface of the bladder as illustrated. Otherwise the drum is familiar to persons skilled in the art from U.S. Pat. Nos. 3,698,987 to Woodhall et al and 3,816,218 to to Felten. The fingers are modified to cooperate with the bladder in accordance with the invention which replaces the bladder of the referenced patents.

Figure 11:
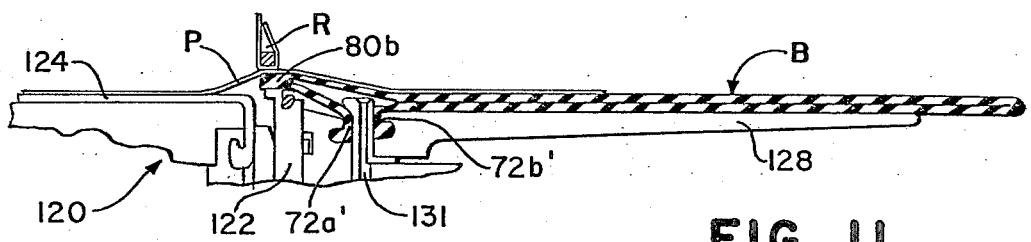
Figure 12:
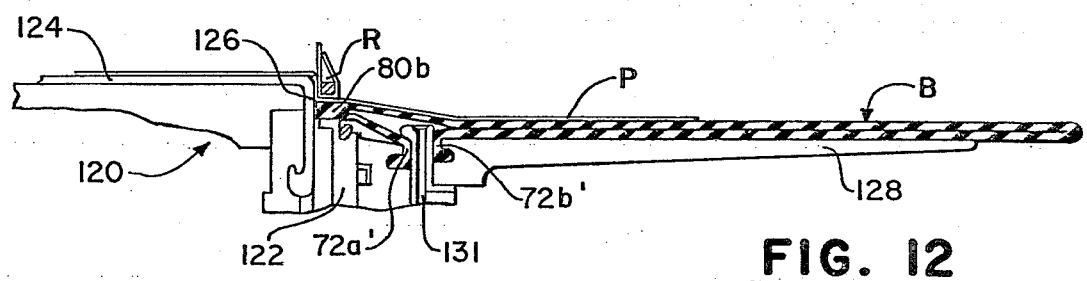
Figure 13:
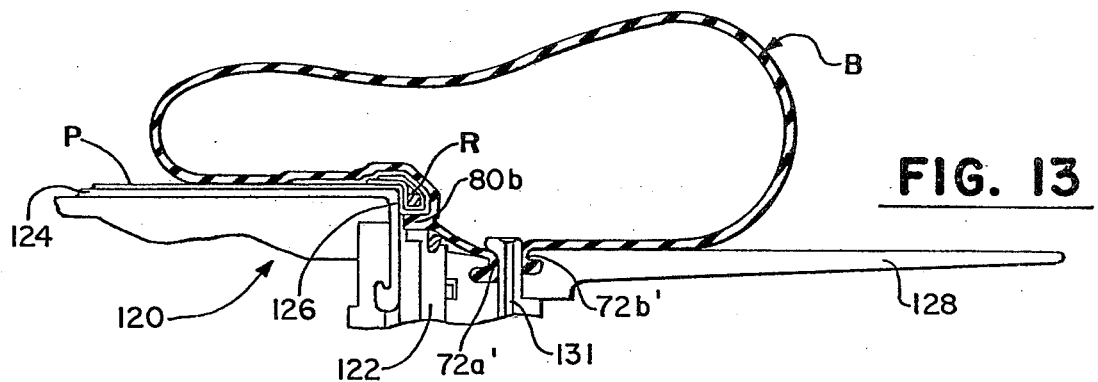

The mode of operation of the drum 120 is depicted in FIGS. 11, 12, and 13. After a ply P or plies have been wrapped about the drum while yet in cylindrical form (FIG. 10), the fingers 122 are expanded radially, FIG. 11. The elastomeric ring 80b at the forward edge of the bladder is thereby expanded, expanding the ply P into firm contact with the inner surface of the bead core assembly R. The bead and the elastomeric ring of the bladder with the ply sandwiched therebetween are thus located concentric with the rotation axis of the drum as well as in the appropriate axial location. The shoulder forming segments 126 of the drum are then expanded, forming a shoulder in the drum center sleeve 124 and in the ply overlying the sleeve. The axially inward surface of the bead is thereby juxtaposed to the ply overlying the drum shoulder. The bladder is then inflated, admitting air by way of the passage 131 between its flanges. In response to inflation alone the bladder moves axially to the left, FIG. 13, turning the ply endings about the bead assembly R to overlie the ply portion extending axially inward from the bead. When the inflation pressure is released, the bladder returns to the uninflated condition as seen in FIGS. 10, 11, and 12. Both movements occur without the assistance of any external instrumentality.

Figure 14:
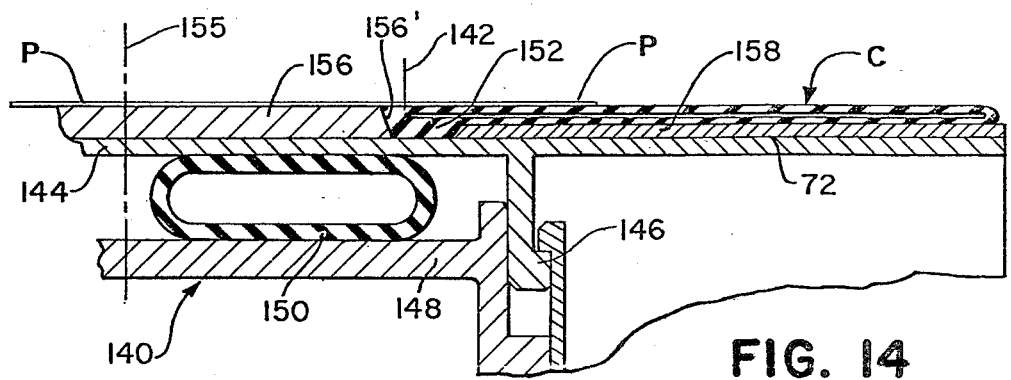
FIGS. 14–17 depict yet another combination in accordance with the invention and its operation.

A further embodiment of the invention, FIG. 14, combines a bladder as described in connection with FIG. 3 and a component forming drum 140 for the purpose of turning a ply P about a fold line 142 to form an endless tire breaker belt subsequently to be assembled with a tire carcass to form a tire. The forming drum 140 includes a plurality of segments 144 arranged in circumferential sequence about a rotation axis. The individual segments each have depending legs 146 which cooperate with the annular center support 148 to maintain the axial alignment of the segments one with another while the segments are moved radially toward and away from the rotation axis. The radial movement of the segments is effected by inflating an expandable annular tube 150 which is disposed coaxially between the respective segments 144 and the support 148. The bladder C is secured on the drum by means of a groove 152 of generally trapezoidal contour which is formed circumferentially about the segments. In FIG. 14, only a quarter axial section is illustrated, it being understood that the drum preferably is symmetrical about the centerplane 155, as well as about its rotational axis. To provide for adjustment of the axial location of the fold line 142, thus to accord with the desired width of the breaker belt to be made on the drum, a plurality of surface elements 156 conforming to the arcuate shape of the respective segments 144 and extending axially between the respective elastomeric rings 80c provide the actual working surface. The axial ends 156' of the surface elements are inclined at about 15° with respect to a plane normal to the rotation axis to form one wall of the trapezoidal groove 152, the outer wall of which is provided by a similarly inclined surface on a filler member 158 disposed on the surface of the respective segments and providing a cylindrical surface in circumferential engagement with the inner wall 72 of the bladder.

Figure 15:
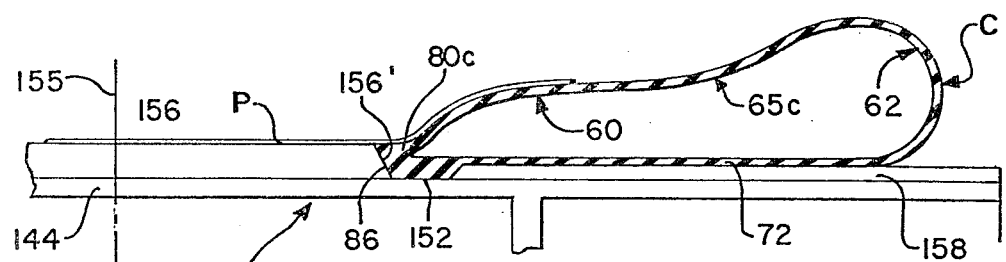
Figure 16:
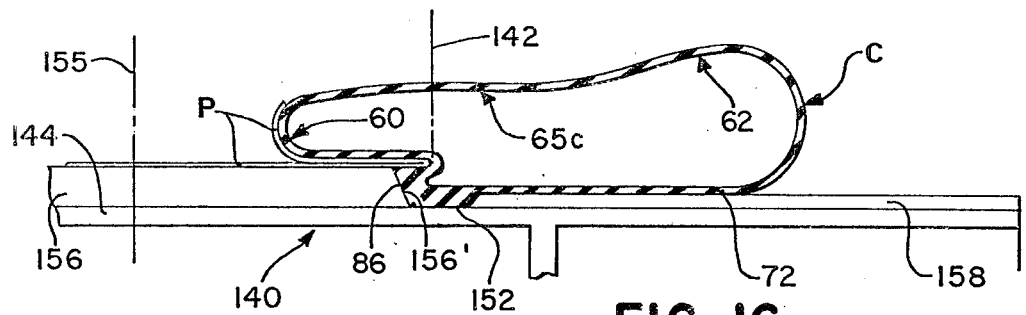
Figure 17:
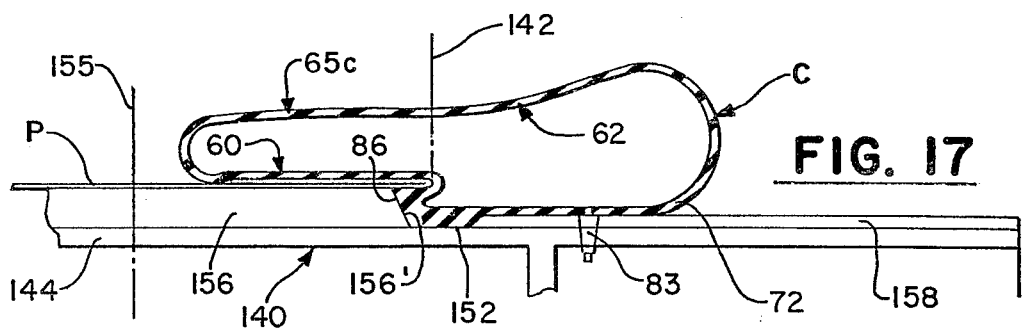

The structure of the forming drum 140 radially inward of the plurality of segments is not within the scope of the present invention and being known need not be further described. For the sake of brevity, we refer to the component forming drum 140 as a belt folder. The axial rolling movement of the bladder C in response to inflation is represented in FIGS. 15, 16, and 17. It should again be emphasized that the movement illustrated occurs solely in response to inflation and entirely without need for external means either to initiate or to carry through the rolling movement. When deflated, the bladder moves axially toward the right in the figures in the reverse sequence, meaning FIGS. 17, 16, 15, with the bladder being restored in response to deflation solely by its own action.

The belt folder bladder has in its zone 60 cords oriented at angles of from 45° to 50° and preferably 50°. In the zone 62 the cord angles in the bladder are from 70° to 80° and preferably oriented at 80°. The dimension X locating the transition zone 65c from the rearward edge 54 may range from 50 to 150 millimeters and is preferably about 50 millimeters. It will be noted that the forward edge 52 of the inflatable bladder, which edge is disposed within the elastomeric ring 80c coincides or very nearly coincides with the plane of the fold line 142 about which the ply ending is turned.

Means for inflating the bladder includes the nipple 83 conventionally inserted in the bladder near the forward edge, and in particular in a location such as that indicated where the inner wall of the bladder remains substantially in contact with the support member 158.

Referring again to FIGS. 14 through 17, a further embodiment of a bladder-belt folder combination in accordance with the invention employs the bladder D of FIG. 4 instead of the bladder C of FIG. 3. The external dimensions of the bladder are identical; however, the cord angles in the zone 60 are 47° whereas the cord angles in zone 62 are 72°. The dimension X locating transition zone 65 with respect to the rearward edge 54 is 195 millimeters. In this embodiment the bladder D, FIG. 4, has a further distinction in that the cord plies of the zone 60 extend from the transition zone 65 to and about the forward edge and thence, in the inner wall to the transition zone 77d which is located, the dimension Y, 130 millimeters forward of the edge 54. The location of the second transition zone 77d in the inner wall of the bladder is selected empirically; spaced from the forward edge 52 toward the edge 54 a distance which is sufficient to augment rearward movement during deflation of the bladder. Alternatively, or additionally, the specific location of the second transition zone 77 with respect to the forward edge 52 serves also to limit the forward extent of the rolling movement of the bladder in response to inflation. The overall length of the bladder D is about 355 millimeters. The overall length is defined as the axial distance between the forward 52 and rearward 54 edges while the bladder is uninflated. This length must be selected in terms of the length of the ply end portion which is to be folded about the fold line 142 in order that such portion will overlie the intermediate portion of the belt between its fold lines and remain as the bladder is deflated. This requires that the overall length be greater than the length of the portion to be folded by at least 50 percent and preferably somewhat more.

Bladders C and D for belt folders 140 having diameters of from 21 to 25 inches and from 950 to 1080 millimeters have been successfully operated.

Figure 18:
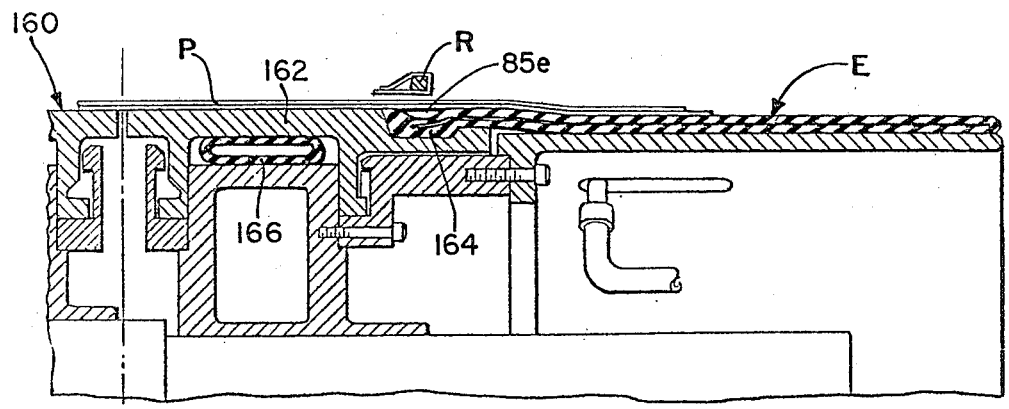
FIGS. 18–21 show a still further embodiment of the invention and its operation.

In a further embodiment of the invention, FIG. 18, a bladder E as described, FIG. 5, forms an operative combination with a tire forming drum 160 for building a tire carcass including an inextensible bead core assembly R. The drum comprises a plurality of radially movable segments 162 disposed in a cylindrical array about the drum axis. To secure the bladder in its operative position a plurality of notches formed respectively in the segments form a groove 164 circumferentially about the drum which groove is conjugate with and receives the elastomeric ring 80e which surrounds the forward edge 52 of the bladder E. This ring 80e is provided with the annular groove 85e open radially outward to register the bead assembly R in a predetermined axial location with respect to the forming drum 160. The cylindrical surface provided by the segments 162 receives the tire component ply P, or plies, therearound, which ply extends axially to overlie the bladder E. The ring 80e and forward edge 52 of the bladder expand radially together with the radially outward movement of the segments induced by inflating the annular tube 166 which is disposed around a rigid annular segment support.

Figure 19:
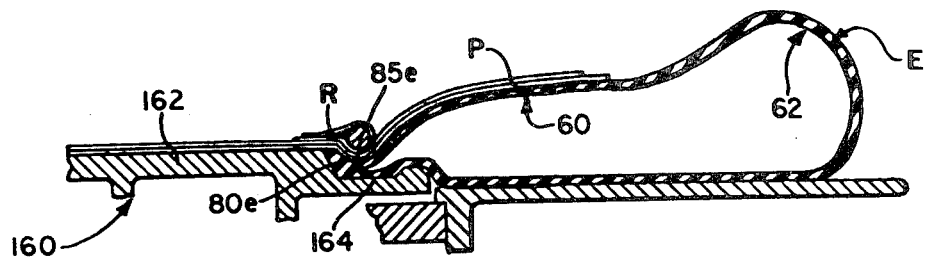
Figure 20:
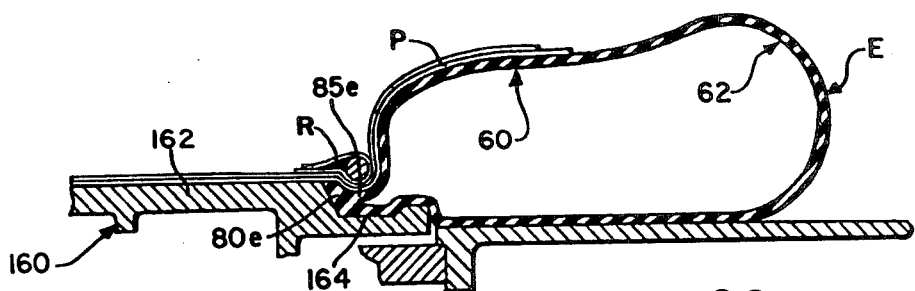
Figure 21:
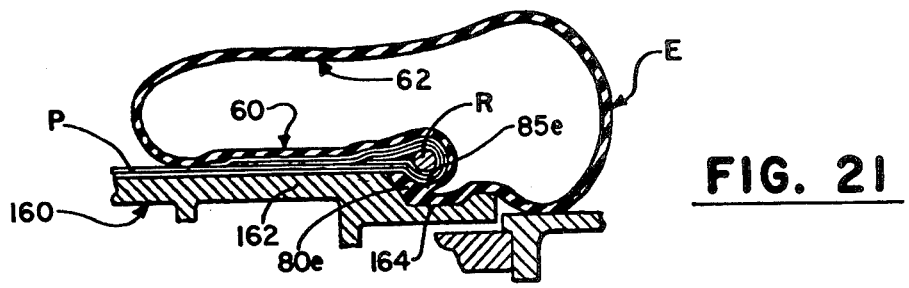

After the bead assembly R is positioned in the appropriate axial location in coplanar relation with the forward edge 52 of the bladder, and aligned with the groove 85e as may be seen in FIG. 19, the segments 162 are moved radially outwardly. The inextensible bead core assembly R cooperates with the expanding drum to conform the ply P with groove 85e as the latter is expanded by the movement of the segments. In response to inflation, the bladder E then progressively rolls axially, solely in response to its inflation and without intervention of any external means, to roll the ply endings over and about the bead assembly, and as may be seen in FIG. 21 causes the ply endings to overlie the intermediate portion of the ply P axially inwardly from the bead assembly R. The internal pressure in the bladder also serves to stitch or adhere the ply endings to the intermediate ply portion. Upon deflation the bladder returns to the position illustrated in FIG. 18, again without the use of any means external to the bladder itself and solely by its own elastic properties.

In the arrangement of FIGS. 18 through 21, the zone 60 of the bladder E has cords whose angles are of from 55° to 65° and preferably of 60°, while in the zone 62 are cord plies having cord angles of from 75° to 85° and preferably 80°. In the bladder, FIG. 5, as employed in the combination of FIG. 18, the forward edge 52 of the inflatable bladder E is disposed in coplanar relation with the mid-plane of the annular groove. The transition zone 65 is located inwardly, dimension X, from the rearward edge 54 of the bladder a distance of from 50 to 150 millimeters and in particular at 50 millimeters in the present embodiment. The cord plies of zone 62 have angles of from 75° to 88° and preferably 80° and extend from the transition zone 65 to and about the rearward edge 54 and thence in the inner wall 72 to the vicinity of the forward edge 52 whereat the plies of the zone 62 are circumferentially spliced to the plies of zone 60.

Figure 22:
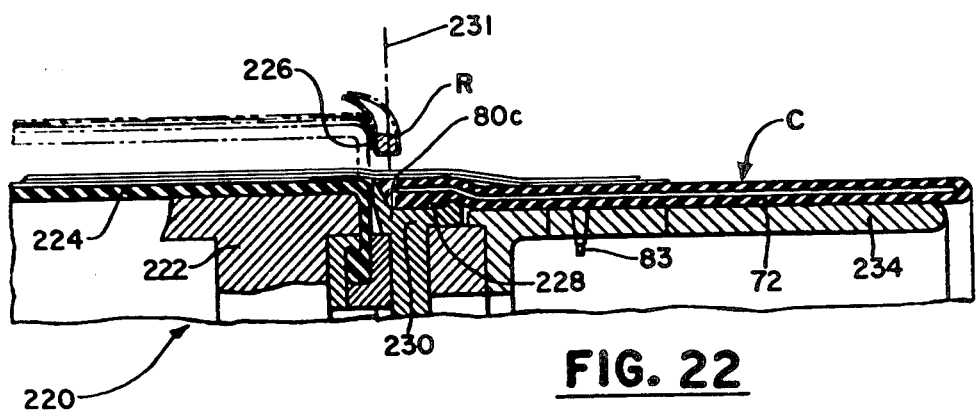
FIGS. 22–25, 26 and 27 illustrate additional combinations embodying the invention showing the operations thereof.
Figure 23:
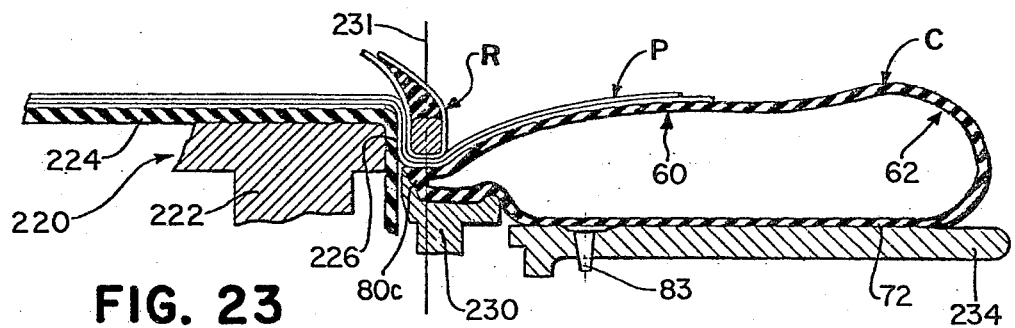
Figure 24:
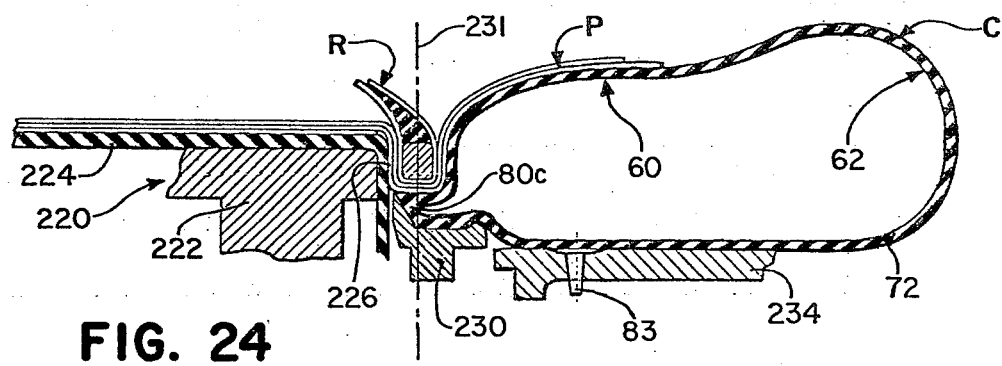
Figure 25:
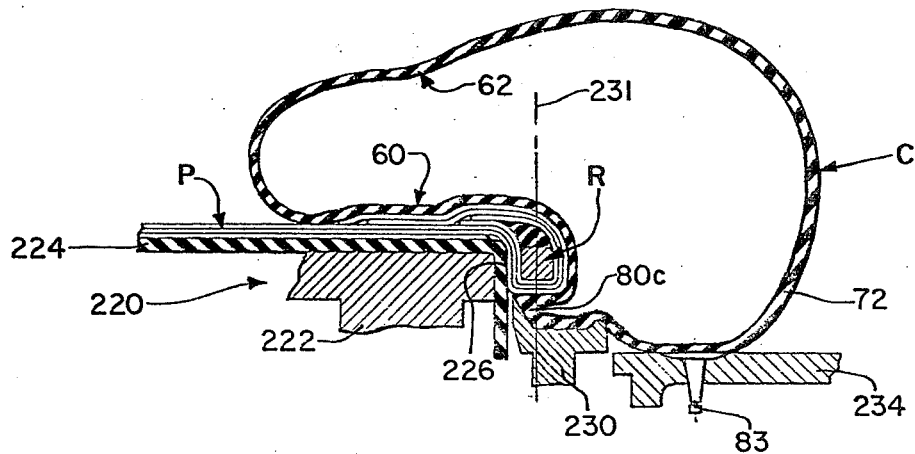

Another embodiment of the invention, FIG. 22, provides an operative combination of the bladder C of FIG. 3 in a tire carcass forming drum 220 provided with a plurality of shoulder-forming segments 222 and a cylindrical center sleeve 224. Any convenient mechanism can be provided to move the segments radially of the drum axis so that the expandable center sleeve is expanded to a radial height from the drum axis to form a shoulder 226. The elastomeric ring 80c at the forward edge of the bladder is retained in the circumferential groove 228 formed in the plurality of ring segments 230 movable radially of the drum axis independently of the segments 222. The forward edge 52 of the bladder is located relative to the drum shoulder such that the center plane 231 of the bead core assembly R coincides or very nearly coincides with the plane defined by the forward edge. It has been found that this location contributes materially to the satisfactory performance of the turn-up operation in making the tire carcass.

The inner wall 72 of the bladder is engaged and supported by an auxiliary drum 234 of fixed diameter which provides an opening to accommodate the air nipple 83 which is fixed integrally in the inner wall of the bladder.

The mechanism for effecting radial movement of the shoulder segments 222 and the ring segments 230 which expand the elastomeric ring 80c of the bladder C is not within the scope of the invention; however, one mechanism suitable to provide the required movements is described in the above-mentioned patent to Felten. It should be noted, however, that the ring segments 230 of the drum 220 differ from the bead engagement fingers illustrated by Felton, in being adapted to form the groove 228 described above.

In the forming drum 220, the plies of the zone 60 of the bladder are of cords oriented at from 55° to 65° and preferably 60°. The cords of the plies of the zone 62 are oriented at from 75° to 85° and preferably at 80°. The transition zone 65 is located, dimension X, forward of the rearward edge by 50 to 150 millimeters and specifically in the present embodiment at 50 millimeters. The second circumferential splice in the transition zone 77c can optimally be located in the inner wall of the bladder about 80 millimeters toward the rearward edge from the forward edge 52. In the bladder C, FIG. 22, the splice of the zone 77c is adjacent the forward edge and within the trapezoidal form of the elastomeric ring 80c. In the particular embodiment shown, the bladder has an overall length between the respective edges of 330 millimeters. This length can be adjusted to suit the space available having regard to the requirement of sufficient length to turn the given ply end portions about the bead assembly R. The bead assembly illustrated is for a 13-inch bead diameter tire and the bladder diameter measured at the surface of the elastomeric ring opposed to the bead assembly is only sufficiently smaller to permit the bead assembly to be moved axially over the bladder. By changing only the diametral dimensions of the bladder it can readily be adapted to tire bead diameters of from 10 to 15 inches.

In operation, illustrated in the sequence of FIGS. 22–25, a carcass ply P or plies are disposed about the drum in the usual manner. The bead assembly is moved coaxially over the bladder and then the ring segments 230 are extended radially thereby expanding the plies into intimate contact with the radially inner surface of the bead assembly. The segments 222 and center sleeve 224 are then expanded to form the shoulder. With the assembly R held concentric with the drum axis by the ring segments and the elastomeric ring 80c of the bladder, the bladder C is then inflated which inflation rapidly and progressively changes the shape of the bladder through the successive stages shown in FIGS. 22–25 causing an axial rolling movement of the bladder which turns the ply endings outward and axially over the ply portions lying inward of the bead assembly. Again, this rolling movement of the bladder C occurs without any assistance whatsoever from any means external to the bladder itself. On being deflated, the bladder rapidly and progressively returns through the stages represented in the figures, but in the reverse order, FIGS. 25, 24, 23, 22, returning to the uninflated condition illustrated in FIG. 22.

Figure 26:
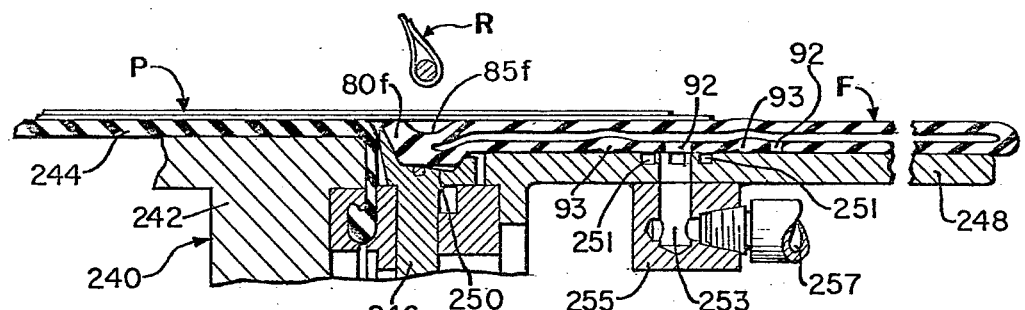

A further embodiment of the invention, having additional advantages, is the combination of the bladder F of FIG. 6 and the carcass forming drum 240 illustrated by FIG. 26. The drum 240 is provided with a plurality of shoulder segments 242, a center sleeve 244 and ring segments 246 identical in all respects with those described in connection with FIG. 22. The drum 240 differs from the drum 220 in that a fixed diameter bladder support drum 248 is substituted for the side drum 234 of FIG. 22, particularly to accommodate the bladder F. The elastomeric ring 80f having a trapezoidal form is secured in the circumferential groove 250 formed in the plurality of ring segments 246. The bladder extends axially outwardly, being supported on the cylindrical surface of the support drum 248.

The drum 248 is provided with a plurality of circumferential grooves 251 spaced axially from the ring segments 246 to register with the previously described inflation port 92 in the bladder F. Air-flow communication to the port is provided by a passage 253 through the wall of the drum 248 and a fitting 255 secured integrally to the side drum and having a threaded hole to accommodate an air-flow tube terminal 257. The sealing ridges 93 previously mentioned engage the cylindrical surface of the drum 248, one at each side of the circumferential grooves 251. This modification to the bladder of the invention provides a signal advantage in that the bladder F can be placed upon the drum or removed from the drum without any mechanical disassembly of means conducting inflation air as well as of any structural part of the drum. Thus, one bladder can be substituted for another for any reason with a minimum of time and effort merely by radially stretching the bladder and then moving it over the drum to bring it into place.

Figure 27:
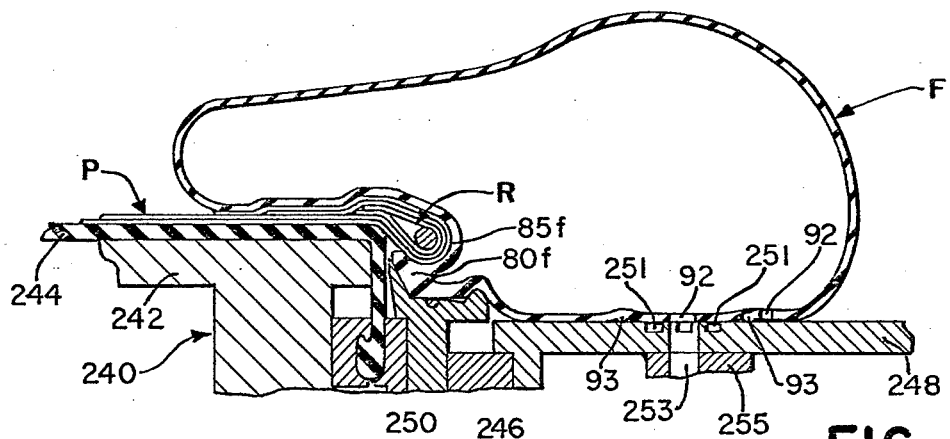

The bladder here has a still further advantage in that, as may be seen in FIG. 27, of protecting the bladder both form excessive axial movement and from excessive inflation pressure. It will be noted that as the bladder moves axially to the left in FIG. 27, the rolling movement tends to lift the inner wall away from the cylindrical surface of the side drum. It will be evident upon inspection of the figure that a positive limit of the axial movement will be reached when the inner wall of the bladder lifts the outer sealing ridge 93 sufficiently to release inflation air from within the bladder, thus preventing the further movement of the bladder toward the left as seen in the figure. It will also be apparent that any excess of inflating air pressure will be released even before the limit of axial movement has occurred on account of the tendency of too great an air pressure to escape between the inner wall and the cylindrical support surface.

The bladder F, FIG. 26, has in its zone 60 cords oriented at 60°. The cords of the plies in the zone 62 are oriented at 80°. The transition zone 65e is spaced forward from the rearward edge at 100 millimeters. The plies of the zone 62 extend from the transition zone 65e to and about the rearward edge 54 and thence forward in the inner wall of the bladder to the forward edge to and somewhat beyond the edge 52 (about 8 millimeters). The plies of the zone 60 extend forward from the transition zone to and equally beyond the forward edge 52. The respective plies of the two zones are secured to each other by a precure cement so as, when cured, to form a circumferential splice uniting the respective plies to define the forward edge 52 closing the air chamber thereat in a manner substantially equivalent of that discussed in connection with the other bladders in accordance with the invention.

In operation, building a tire on a drum, FIG. 26, proceeds identically to that described in connection with the drum 220, FIG. 22. After the bead assembly is positioned and the ring segments are expanded as previously described, the bladder is inflated by passing air through the passage 253 and the inflation port 92. On being inflated, the bladder passes thorugh stages like the stages illustrated in FIGS. 23, 24 and 25, turning the ply endings outward and about the bead assembly R to overlie the ply portion extending inwardly thereof. The limit of the axial rolling movement in the bladder is determined by the location of the inflation port 92, and the circumferential grooves 251, with respect to the length of the contour of the bladder. Again, it is pointed out that the bladder moves solely in response to inflation and requires no external instrumentality to create the axial movement. On being deflated the bladder returns to the condition illustrated in FIG. 26, again without necessity of any mechanical means external to the bladder itself.

In a modification of the bladder F (FIG. 6, 26 and 27) the bladder F may have in addition to the port 92 a simple vent hole (as shown by dotted lines and denoted by reference numeral 92' in FIG. 26 only) extending through the inner wall 72 and suitably located between the rearward sealing ridge 93 and the rearward edge 54. In this case it will be apparent that the limit of the axial rolling movement in the bladder is determined by the location of said vent hole 92'.

It will be seen that this invention has provided an annular bladder inflatable to perform useful operations as in turning a ply ending about a tire bead to form a tire carcass and in turning an endless ply portion about a designated fold line to form a tire breaker belt. A variety of fold patterns can readily be made.

It will be apparent to persons skilled in the art that an annular bladder in accordance with the invention can readily be employed, in combination with diverse forming drums, to wrap a ply ending about an associated bead core assembly in a wide variety of arrangements. For example, the combination of FIGS. 18, 19, 20 and 21 illustrates turning ply endings about a bead core assembly without forming a shoulder in the drum. FIGS. 7, 8, and 9 illustrate turning ply endings about a bead core assembly positioned against an initially formed shoulder of the drum and plies. Thus, from the foregoing descriptions, persons skilled in the art will readily conceive related and other applications for the bladder of the invention.

Figure 28:
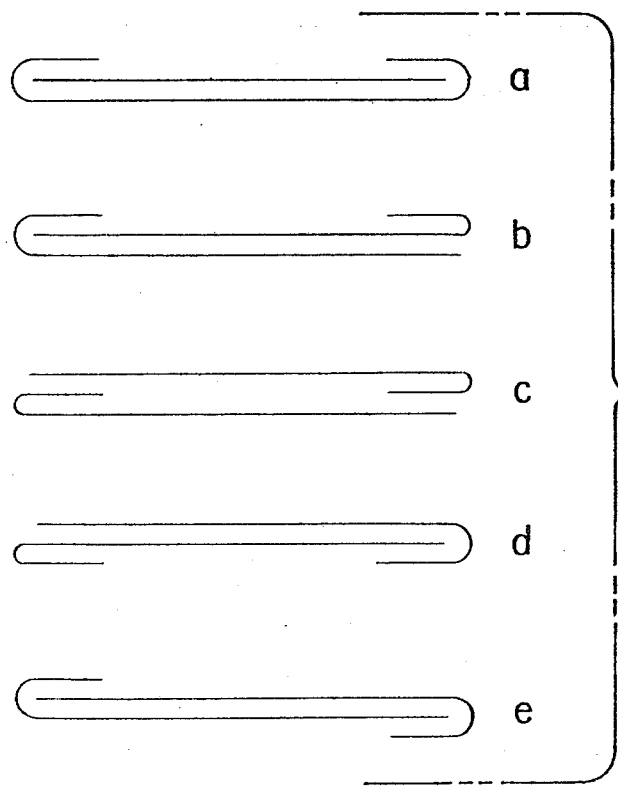
FIG. 28 depicts representative section views of folded belts, breakers, and the like, the making of which is facilitated by the practice of the invention.

With respect to folding edges of tire breaker belts, as well as similar folding operations which can be performed on divers endless flexible bands, certain representative cross-sections of breaker belts are illustrated in FIG. 28.

In FIG. 28, a few representative examples of endless breaker belts of folded configurations are illustrated by the schematic cross-sections $a$ through $e$. Other patterns in which one or more endless band plies can be folded by a bladder-belt folder according to the present invention will be readily apparent to persons skilled in the related arts. In the belt $a$ of FIG. 28, the two edge portions of a wider band are turned to overlie a narrower band. The belt $a$ can be formed symmetrically as shown or one of the edge portions can be longer than the other. The belt $b$ in the figure employs two bands of equal width but offset axially of each other. Each single edge portion is folded to overlie the intermediate two-ply part. Both belt $a$ and belt $b$ can be folded at both edges simultaneously on the folder 140. The belts $c$, $d$ and $e$ seen in FIG. 28, the respective overlying portions must be folded one after the other; each, however, also employs two bands of equal width.

The cord material of the respective bands in the belts of FIG. 28 can be the same or different in the two bands. Normally, the cord angles will be of opposing angles with respect to the plane of the circumference. The cord materials can be any material suitable for tire construction, including but not limited to steel wire, glass fiber, and aramid, such as Flexten (Reg. T.M).

Breaker belts of various configurations are employed in tires for diverse purposes, one of which is the reduction of the stresses leading to failure of adhesion of the component parts of the tire at or close to the edges of a belt. By forming folded edges the stresses are reduced or distributed to an extent that such failure, known as edge separation, is avoided or at least inhibited. It is also known to be advantageous to remove the single terminal edges of a belt or belt component from the region of the tire shoulder where such stresses are likely to be most severe.

The invention thus provides capabilities giving a tire designer far greater freedom in selecting a configuration of folded breaker belts for use in tires, particularly in radial ply tires. Moreover, the capabilities of the belt folders, FIG. 14, enable economic folding of belt ply components in endless form, thus alleviating the difficulties having to do with splicing already folded ply components in open end length in order to make the endless belt required in the tire.

While certain representative embodiments and details have been shown for the purpose of illustrating the invention, it will be apparent to those skilled in the art that various changes and modifications may be made therein without departing from the spirit or scope of the invention.

What is claimed is:

1. An annular bladder providing, when disposed on support means, both circumferential expansion and rolling movement normal to its circumference in response solely to inflation and deflation thereof, said bladder having a cylindrical outer wall extending uninterruptedly from a forward edge to a rearward edge and being turned radially and axially inward at the respective edges, the bladder comprising a first and a second circumferential zone and in said outer wall a transition zone spaced rearwardly from said forward edge, said first zone extending in a forward direction in said outer wall from said transition zone, said second zone extending in a rearward direction in said outer wall from said transition zone, said first zone having greater resistance to circumferential elongation relative to the second zone and said second zone having lesser resistance to circumferential elongation relative to the first zone, said transition zone being located a predetermined distance forward of the rearward edge of said bladder when the same is uninflated, said rolling movement being in the direction of said forward edge on inflation and toward said rearward edge on deflation of said bladder.

2. A bladder as claimed in claim 1, each of said first and second zones having a pair of cord plies of cords oriented at equal and opposite acute angles with respect to the plane of the circumference of the bladder, the angle of the cords of said first zone being a lesser acute angle and the acute angle of the cords in said second zone being a greater acute angle.

3. A bladder as claimed in claim 2, said lesser angle being selected in the range of 35° to 65°, said greater angle being selected in the range of 45° to 90°, and said predetermined distance being at least 10 percent of the distance between the forward and the rearward edge while the bladder is uninflated.

4. A bladder as claimed in claim 2, said bladder comprising an elastic membrane of uniform thickness encasing said cord plies and inflation inlet means associated therewith to accommodate flow of inflating air into and out of the bladder.

5. A bladder as claimed in claim 1 in operative combination with a tire component forming drum for building a component of a tire, said bladder further comprising an inner wall extending axially inwardly from the respective edges, said drum comprising a cylindrical support engaging circumferentially said inner wall, and securing means for removably fixing said inner wall relative to said drum near said forward edge, said bladder being removable from said drum and replaceable thereon as an integral unit.

6. A bladder as claimed in claim 5, said inner wall having an inflation inlet opening means formed therein, said cylindrical support having a port means fixed therein in axial registry with said opening to pass air to and from said opening to inflate and deflate the bladder, both said opening means and said port means terminating at the respective surfaces of said inner wall and said cylindrical support.

7. A bladder as claimed in claim 5, said inner wall having a first portion extending from said forward edge and a second portion extending from said rearward edge, each said portion terminating in an annular flange, said securing means engaging each said flange, and inflation inlet means for accommodating flow of air into and out of the bladder disposed between the flanges.

8. A bladder as claimed in claim 5, the bladder further comprising a third zone in said outer wall having lesser resistance to circumferential elongation than said first zone, a second transition zone between said first zone and said third zone and spaced from said forward edge sufficiently to permit the outer wall in said third zone to conform to a tire bead disposed therearound.

9. A bladder as claimed in claim 5, said bladder further comprising an elastomeric ring secured integrally to said forward edge to cooperate with an inextensible bead ring disposed about said forward edge while a tire ply is folded therearound to form a tire carcass.

10. A bladder as claimed in claim 5, said inner wall extending continuously from one to the other of said edges to form with said outer wall a tubular annular bladder, and inflation means disposed in said inner wall and terminating at the radially inner surface thereof for air flow into and out of the bladder.

11. A bladder as claimed in claim 10, said securing means comprising an elastomeric ring formed integrally with and around said forward edge, said ring having trapezoidal shape in profile, the slant sides of said shape converging inward radially thereof.

12. A bladder as claimed in claim 11, wherein the slant sides are at 15 degrees with a plane parallel to the circumference of the bladder.

13. A bladder as claimed in claim 11, said securing means comprising a circumferential groove provided on said drum and conjugate with said trapezoidal shape.

14. A bladder as claimed in claim 13, said drum comprising a plurality of segments movable radially of the drum, each said segment having a notch of trapezoidal form cooperating with notches in others of said segments to provide said circumferential groove.

15. A bladder as claimed in claim 14, said segments cooperating to provide a cylindrical building surface for forming said tire component.

16. A bladder as claimed in claim 15, wherein said building surface and the outward circumferential surface of the bladder are at the same radial level.

17. A bladder as claimed in claim 9, wherein said elastomeric ring is provided with an annular groove open radially outward for registering a bead-ring with respect to a tire ply disposed on said drum.

18. An annular bladder as claimed in claim 2 in combination with a tire component building apparatus, said bladder having an inner wall, a drum providing a cylindrical surface for a tire component ply to be disposed circumferentially thereon and to be extended axially thereof to overlie said bladder, and securing means fixing said inner wall axially of said drum.

19. An annular bladder as claimed in claim 18, said inner wall having a first portion extending from said forward edge and a second portion extending from said rearward edge, each said portion terminating in an annular flange, said securing means engaging each said flange, and inflation inlet means for accommodating flow of air into and out of the bladder disposed between the flanges.

20. An annular bladder as claimed in claim 18, said bladder further comprising a third zone having a pair of cord plies of cords oriented at equal and opposite angles with respect to the plane of the circumference of the bladder, said angles of the third zone being greater than the angles of said first zone, the plies of said third zone being spliced to the plies of said first zone in a second circumferential transition zone spaced in said outer wall from the forward edge sufficiently to permit said outer wall to conform to a tire bead disposed therearound.

21. A bladder as claimed in claim 20, said second transition zone being located about 30 millimeters from said forward edge and about 300 millimeters from rearward edge.

22. An annular bladder as claimed in claim 18, said inner wall extending continuously from one to the other of said edges to form with said outer wall a tubular annular bladder, and inflation means for air flow into and out of the bladder disposed in said inner wall and terminating flush with radially inward surface of said inner wall.

23. An annular bladder as claimed in claim 22, said inflation means comprising a flangeless opening in said inner wall, said drum including a cylindrical support engaging circumferentially said inner wall and having a circumferential groove therearound in axial registry with said opening.

24. An annular bladder as claimed in claim 23, said inner wall having a pair of sealing ridges extending circumferentially of and radially inward from the radially inward surface of the inner wall with said opening therebetween.

25. An annular bladder as claimed in claim 18, wherein said lesser angle is selected in the range of 55° to 65°, said greater angle is selected in the range of 75° to 85°.

26. An annular bladder as claimed in claim 18, wherein said lesser angle is 60°, said greater angle is 80° and said forward edge of the bladder is of a diameter to accommodate a tire bead ring of 12 to 15 inches.

27. A bladder as claimed in claim 18, wherein said lesser angle is selected in the range of 45° to 50°, degrees, said greater angle is selected in the range of 70° to 80°.

28. A bladder as claimed in claim 18, wherein said forward edge bladder has a diameter of from 21 to 25 inches, said lesser angle is 45° and said greater angle is 72°.

29. An annular bladder as claimed in claim 18, wherein said lesser angle is selected in the range of 35° to 50°, said greater angle is selected in the range of 45° to 60°.

30. A bladder as claimed in claim 18, wherein said forward edge has a diameter of from 950 to 1080 millimeters, said lesser angle is 40° and said greater angle is 50°.

31. An annular bladder as claimed in claim 1, wherein said transition zone is defined by a circumferential splice joining the cord plies of the first zone with the cord plies of the second zone, and wherein said splice is located inward of the rearward edge toward the forward edge from 10 percent to 50 percent of the distance between said edges.

32. An annular bladder as claimed in claim 1, wherein said transition zone is defined by a circumferential splice joining the cord plies of the first zone with the cord plies of the second zone, and wherein said splice is located inward of the rearward edge toward the forward edge from 50 to 150 millimeters.

33. An annular bladder as claimed in claim 4, said bladder further comprising an inner wall extending continuously between and joined to said outer wall at said edges, a second transition zone whereat said first and second zones terminate at their ends remote from the first said transition zone.

34. An annular bladder as claimed in claim 33, wherein said second transition zone is located in said inner wall near said forward edge.

35. An annular bladder as claimed in claim 33, wherein said second transition zone is located in said inner wall and spaced from said forward edge toward said rearward edge a distance sufficient to limit the forward extent of said movement.

36. An annular bladder as claimed in claim 33, wherein said second transition zone is located in said inner wall and spaced from said forward edge toward said rearward edge a distance sufficient to augment rearward movement during deflation of the bladder.

37. An annular bladder as claimed in claim 33, wherein said second transition zone is located in said inner wall and spaced from said forward edge toward said rearward edge a distance of from 140 to 225 millimeters.

38. An annular bladder as claimed in claim 33, the axial length of said bladder between said edges being about 355 millimeters.

* * * * *